(12) United States Patent
Karlsson

(10) Patent No.: US 9,854,595 B2
(45) Date of Patent: Dec. 26, 2017

(54) SCHEDULING AND ADMISSION OF RADIO BEARERS IN A COMMUNICATIONS SYSTEM APPLYING CARRIER AGGREGATION

(71) Applicant: Telefonaktiebolaget L M Ericsson (publ), Stockholm (SE)

(72) Inventor: Robert Karlsson, Sundbyberg (SE)

(73) Assignee: TELEFONAKTIEBOLAGET LM ERICSSON (PUBL), STOCKHOLM (SE)

( * ) Notice: Subject to any disclaimer, the term of this patent is extended or adjusted under 35 U.S.C. 154(b) by 74 days.

(21) Appl. No.: 14/902,138

(22) PCT Filed: Jul. 1, 2013

(86) PCT No.: PCT/SE2013/050840
§ 371 (c)(1),
(2) Date: Dec. 30, 2015

(87) PCT Pub. No.: WO2015/002579
PCT Pub. Date: Jan. 8, 2015

(65) Prior Publication Data
US 2016/0143047 A1    May 19, 2016

(51) Int. Cl.
*H04W 72/12*    (2009.01)
(52) U.S. Cl.
CPC ..... *H04W 72/121* (2013.01); *H04W 72/1247* (2013.01)
(58) Field of Classification Search
CPC .................. H04W 72/121; H04W 72/1247
See application file for complete search history.

(56) References Cited

U.S. PATENT DOCUMENTS

2012/0127931 A1* 5/2012 Gaal .................. H04L 1/1861
370/329
2012/0213123 A1* 8/2012 Futaki ................ H04L 5/001
370/254

(Continued)

FOREIGN PATENT DOCUMENTS

EP    2427028 A1    3/2012
EP    2448322 A1    5/2012
(Continued)

*Primary Examiner* — Ajay Cattungal
(74) *Attorney, Agent, or Firm* — Murphy, Bilak & Homiller, PLLC

(57) ABSTRACT

A method and a network node (110; 400) for scheduling of resources to radio bearers associated with wireless devices (120, 121, 122) served by a base station (110) in a cell (115). The network node (110, 400) and the base station (110) operating in a wireless communications system (100) applying carrier aggregation. A first group of one or more of the wireless devices (120, 121) is served in the cell (115) as primary serving cell and a second group of other one or more of the wireless devices (122) is served in the cell (115) as a secondary serving cell. The network node (110, 400) assigns higher priority to respective radio bearer associated with the first group than to respective radio bearer associated with the second group based on that the second group is served in the cell (115) as a secondary serving cell. The network node (110, 400) then schedules (302) the resources to the radio bearers based on the assigned priorities. Simple implementation and efficient utilization of benefits from carrier aggregation are enabled.

18 Claims, 6 Drawing Sheets

(56) References Cited

U.S. PATENT DOCUMENTS

2014/0133449 A1* 5/2014 Xu ...................... H04W 52/367
                                                    370/329
2017/0105182 A1* 4/2017 Xu ...................... H04W 52/325

FOREIGN PATENT DOCUMENTS

| EP | 2496034 A1 | 9/2012 |
| EP | 2528401 A1 | 11/2012 |
| WO | 2011150265 A1 | 12/2011 |

* cited by examiner

SCHEDULING AND ADMISSION OF RADIO BEARERS IN A COMMUNICATIONS SYSTEM APPLYING CARRIER AGGREGATION

TECHNICAL FIELD

Embodiments herein relate to a method and networks node in a wireless communications system applying carrier aggregation. In particular embodiments herein relate to scheduling of resources to radio bearers and to admitting a radio bearer to be set-up and be served.

BACKGROUND

Communication devices such as wireless devices may be also known as e.g. user equipments (UEs), mobile terminals, wireless terminals and/or mobile stations. A wireless device is enabled to communicate wirelessly in a cellular communications network, wireless communications system, or radio communications system, sometimes also referred to as a cellular radio system or cellular network. The communication may be performed e.g. between two wireless devices, between a wireless device and a regular telephone and/or between a wireless device and a server via a Radio Access Network (RAN) and possibly one or more core networks, comprised within the cellular communications network.

The wireless device may further be referred to as a mobile telephone, cellular telephone, laptop, Personal Digital Assistant (PDA), tablet computer, surf plate, just to mention some further examples. The wireless device in the present context may be, for example, portable, pocket-storable, hand-held, computer-comprised, or vehicle-mounted mobile device, enabled to communicate voice and/or data, via the RAN, with another entity, such as another wireless device or a server.

The cellular communications network covers a geographical area which is divided into cell areas, wherein each cell area is served by at least one base station, e.g. a Radio Base Station (RBS), which sometimes may be referred to as e.g. "eNB", "eNodeB", "NodeB", "B node", or BTS (Base Transceiver Station), depending on the technology and terminology used. The base stations may be of different classes such as e.g. macro eNodeB, home eNodeB or pico base station, based on transmission power and thereby also cell size. A cell is the geographical area where radio coverage is provided by the base station at a base station site. Cells may overlap so that several cells cover the same geographical area. By the base station serving a cell is meant that the radio coverage is provided such that one or more wireless devices located in the geographical area where the radio coverage is provided may be served by the base station. One base station may serve one or several cells. Further, each base station may support one or several communication technologies. The base stations communicate over the air interface operating on radio frequencies with the wireless device within range of the base stations.

In some RANs, several base stations may be connected, e.g. by landlines or microwave, to a radio network controller, e.g. a Radio Network Controller (RNC) in Universal Mobile Telecommunications System (UMTS), and/or to each other. The radio network controller, also sometimes termed a Base Station Controller (BSC) e.g. in GSM, may supervise and coordinate various activities of the plural base stations connected thereto. GSM is an abbreviation for Global System for Mobile Communications (originally: Groupe Spécial Mobile). In 3rd Generation Partnership Project (3GPP) Long Term Evolution (LTE), base stations, which may be referred to as eNodeBs or eNBs, may be directly connected to other base stations and may be directly connected to one or more core networks.

UMTS is a third generation mobile communication system, which evolved from the GSM, and is intended to provide improved mobile communication services based on Wideband Code Division Multiple Access (WCDMA) access technology. UMTS Terrestrial Radio Access Network (UTRAN) is essentially a radio access network using wideband code division multiple access for wireless devices. High Speed Packet Access (HSPA) is an amalgamation of two mobile telephony protocols, High Speed Downlink Packet Access (HSDPA) and High Speed Uplink Packet Access (HSUPA), defined by 3GPP, that extends and improves the performance of existing 3rd generation mobile telecommunication networks utilizing the WCDMA. Moreover, the 3GPP has undertaken to evolve further the UTRAN and GSM based radio access network technologies, for example into evolved UTRAN (E-UTRAN) used in LTE.

In the context of this disclosure, the expression downlink (DL) is used for the transmission path from the base station to the wireless device. The expression uplink (UL) is used for the transmission path in the opposite direction i.e. from the wireless device to the base station.

Long Term Evolution-Advanced (LTE-A) is e.g. specified as part of a Release 10 of 3GPP specifications and it offers higher data rates than previous releases. One way of accomplishing this is through so called Carrier Aggregation (CA) where more than one carrier is used to thereby increase the overall transmission bandwidth. LTE-A defines three carrier-aggregation scenarios: single-band (or intra-band) contiguous, single-band non-contiguous, and multiband (inter-band) non-contiguous. Carrier aggregation is supported by both Frequency Division Duplex (FDD) and Time Division Duplex (TDD) in LTE. Each carrier involved in CA is referred to as a Component Carrier (CC) and belong to either one of two categories: Primary Component Carrier (PCC) and Secondary Component Carrier (SCC). There is one downlink PCC (DL PCC) and one associated uplink PCC (UL PCC), and may be one or more SCCs, including both UL SCCs and DL SCCs. When carrier aggregation is used there are a number of serving cells for each UE being served, one serving cell for each CC, i.e. one primary serving cell and one or more secondary serving cells. The coverage of the serving cells may differ. Connection of a UE in LTE through Radio Resource Control (RRC) is handled by the primary serving cell that thus is served by the PCC, or more specifically the DL and UL PCC. It is also on the DL PCC that the UE receives Non-Access Stratum (NAS) information, such as security parameters and in idle mode the UE listens to system information on the DL PCC. Physical Uplink Control CHannel (PUCCH) is sent on the UL PCC. The SCCs may be added and removed as required, while the PCC is only changed at handover. The eNB decides which cell that is the primary serving cell, which is taken care of by handover, and it can also decide that a UE shall utilize one or more SCCs, i.e. be served in one or more secondary serving cells. The configuration of, and activation and deactivation of, CCs may, for example, be based on measurements performed by eNBs and/or UEs. The decision to configure and serve a UE using CA may also be based on the type services, and thus radio bearers, that the UE is or may be associated with and the capabilities of the UE.

It is realized that a wireless communications system applying CA require, or at least may benefit, from various aspects of adaptation compared to a conventional situation without CA since there are multiple serving cells involved at the same time, not only one as conventionally is the case. It is further desirable that any adaptation is backwards compatible so that wireless devices that do not support CA may coexist with wireless devices that do support CA.

SUMMARY

An object is to provide adapted and/or improved handling in a wireless communications system applying carrier aggregation.

According to a first aspect of embodiments herein, the object is achieved by a method in a network node for scheduling of resources to radio bearers associated with wireless devices being served by a base station in a cell. The network node and the base station are operating in a wireless communications system applying carrier aggregation. A first group of one or more of the wireless devices is served in the cell as primary serving cell and a second group of other one or more of the wireless devices are served in the cell as a secondary serving cell. The network node assigns higher priority to respective radio bearer associated with the first group than to respective radio bearer associated with the second group based on that the second group is served in the cell as a secondary serving cell. The network node schedules the resources to the radio bearers based on the assigned priorities.

According to a second aspect of embodiments herein, the object is achieved by a network node for scheduling of resources to radio bearers associated with wireless devices being served by a base station in a cell. The network node and the base station are adapted to operate in a wireless communications system applying carrier aggregation. A first group of one or more of the wireless devices is served in the cell as primary serving cell and a second group of other one or more of the wireless devices are served in the cell as a secondary serving cell. The network node comprises an assigning circuitry configured to assign higher priority to respective radio bearer associated with the first group than to respective radio bearer associated with the second group based on that the second group is served in the cell as a secondary serving cell. The network node further comprises a scheduling circuitry configured to schedule the resources to the radio bearers based on the assigned priorities.

According to a third aspect of embodiments herein, the object is achieved by a method in a network node for admitting a radio bearer to be set-up and be served in a cell. The radio bearer is associated with a wireless device served by a base station in the cell. The network node and the base station are operating in a wireless communications system applying carrier aggregation. The wireless device is served in the cell as secondary serving cell. The network node receives a request for the radio bearer to be set up and be served in the cell. The network node identifies that the received request relates to serving in the cell as secondary serving cell. The network node admits, based on the identification, the radio bearer to be set up and be served in the cell as secondary serving cell.

According to a fourth aspect of embodiments herein, the object is achieved by a a network node for admitting a radio bearer to be set-up and be served in a cell. The radio bearer is associated with a wireless device served by a base station in the cell. The network node and the base station are adapted to operate in a wireless communications system applying carrier aggregation. The wireless device is served in the cell as secondary serving cell. The network node comprises a receiving port configured to receive a request for the radio bearer to be set up and be served in the cell. The network node further comprises an identifying circuitry configured to identify that the received request relates to serving in the cell as secondary serving cell. Moreover, the network node comprises an admitting circuitry configured to admit, based on the identification, the radio bearer to be set up and be served in the cell as secondary serving cell.

As a result, in high load situations the resources scheduled in the cell as primary serving cell will dominate and behavior will tend towards that in a conventional system without carrier aggregation. On the other hand, in low load situations, high peak rates as expected and desirable from a system applying carrier aggregation are still possible. At the same time simple implementation is enabled. Also, efficient yet simple admission control is enabled.

BRIEF DESCRIPTION OF THE DRAWINGS

Examples of embodiments herein are described in more detail with reference to the appended schematic drawings, in which.

DETAILED DESCRIPTION

Figure 1:
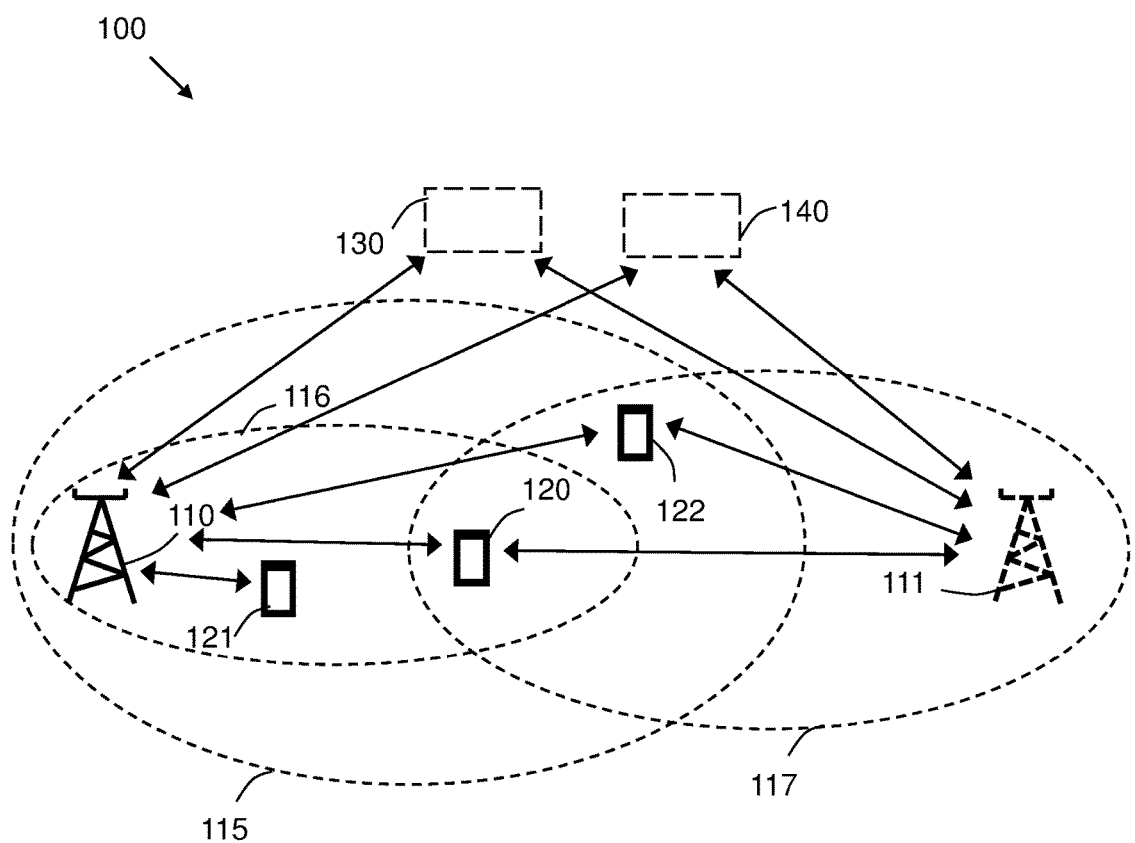
FIG. 1 is a schematic block diagram depicting a simplified example of a wireless communications network applying carrier aggregation, in relation to which embodiments herein will be explained.

Conventional wireless communications systems not applying carrier aggregation include functionality relating to admission control and/or scheduling of resources. Admission control and scheduling of resources is functionality suggested herein for adapted and/or improved handling in a wireless communications system applying carrier aggregation.

Admission control refers to a function handling the task of deciding whether to admit or reject a request for a radio bearer setup in a cell served by a base station. The admission control decides whether to accept or reject a request for a radio bearer setup based on a present load in the cell, e.g. in form of usage of certain Monitored System Resources (MSRs) in the cell as well as the type of radio bearer the request relates to. For example, in a wireless communications systems a wireless device may have on-going services, for which the base station serving the wireless device may have set up a number of radio bearers. The services may be of different types. For example, a service may be a Voice over IP (VoIP) call a user of the wireless device initiates. To set up such radio bearer a request for a radio bearer setup is made. In LTE-based systems it is the Mobility Management Entity (MME) that sends requests for radio bearer set up to the base station that receives it and an admission control function in the base station evaluates the current load in the cell in which the base station serves the wireless device. The MME may send the request e.g. in response to that it has been initiated a VoIP call to a wireless device being served by the base station. The VoIP call may e.g. have been initiated through an application running on another wireless device or on a personal computer connected to the Internet. Note that the request for radio bearer set-up may be sent by other another node than the MME in non-LTE based systems and that the admission control functionality may be located in another node than the base station. If the admission control functionality concludes that there are enough resources available for allowing setup of the VoIP call in the cell, the request is accepted, and a radio bearer is set up for the VoIP call. On the other hand, if it is determined that the current load is too high for allowing the VoIP call, the request for resources is rejected. A simple example of an admission control algorithm: For each MSR it is estimated the amount needed by a request for a radio bearer set-up. Then, for each MSR, the value of the MSR plus the estimated amount is compared to an admission threshold for each MSR. If below the threshold for each MSR, the radio bearer is admitted and set-up, else the request is rejected, and/or methods to prioritize among already admitted requests may be triggered in order to make room for the request.

Radio bearers are sometimes denoted Radio Access Bearers (RABs), or, in evolved packet systems as LTE, Evolved-RABs (E-RABs). A radio bearer may be regarded as a virtual connection between two endpoints, which provides a transport service.

Furthermore, the transport service, and thus the radio bearer, is typically associated with one or more specific Quality of Service (QoS) attributes and requirements. For example, data packets related to a VoIP call should apparently not be delayed more than a certain number of ms. Thus, a radio bearer set up for a VoIP call may be assigned a QoS attribute related to e.g. a Guaranteed BitRate (GBR) and/or a maximum packet delay.

Different services have different demands for example regarding bit rate and delay. There may be a difference made between services and radio bearers associated with QoS requirements, and services and radio bearers without QoS requirements. The latter may be referred to as "best effort services". Services and radio bearers associated with QoS requirements relate to services such as VoIP that need at least a certain bit rate to function at all. For a best effort service, e.g. a File Transfer Protocol (FTP) service, the user may be considered satisfied as long as the bit rate is not zero.

Scheduling of resources in a conventional wireless communication system is made with regard to radio bearers that have been set up, i.e. admitted radio bearers, each associated with a respective wireless device, and is handled by a scheduling functionality that commonly is referred to as the scheduler. The scheduler i.a. has a function of dividing resources available for scheduling between different wireless devices and services with the goal of fulfilling QoS requirements. When the QoS is in danger of being violated, resources are typically assigned according to priority levels. Best-effort services may not be prioritized at all since they lacks a strict QoS requirement, or may be associated with a low priority level compared to radio bearers associated with QoS radio bearers, i.e. radio bearers associated with a more specific QoS requirement. The prioritization may be implemented through weights and weight functions, where a higher weight normally refers to higher priority. A particular radio bearer associated with a specific QoS requirement may be assigned a scheduling weight through such weight function that depends on experienced, e.g. a current measured QoS. For example, if the QoS requirements are associated with delay since last scheduled, the weight function may be defined to increase weight, and thus priority, with increased experienced delay. A higher priority, e.g. by an assigned weight, results in increased likelihood for resources to be allocated to the radio bearer compared to another radio bearer associated with a lower priority or weight.

A user or radio bearer can be said to be satisfied when the QoS requirements are fulfilled during the whole connection.

A relation between the admission control functionality and the scheduling functionality is that admission control can limit the amount of traffic by not allowing new radio bearers to be set up in order to protect the service of existing, already set up, i.e. admitted, radio bearers associated with QoS requirements.

FIG. 1 is a schematic block diagram depicting an example of a wireless communications system 100 applying carrier aggregation, in relation to which embodiments herein will be explained. By applying carrier aggregation is referred to that the wireless communications system 100 actively supports carrier aggregation, that is, as mentioned above, that the wireless communications system 100 actively supports serving of an individual wireless device in multiple cells at the same time, in one primary serving cell and one or more secondary serving cells. The wireless communications system 100 comprises a first base station 110 serving a first cell 115 and a second cell 116. There are wireless devices 120-122 located and served by the first base station 110 in the first cell 115. The wireless devices 120, 121 are also located and served by the first base station in the second cell 116. To be more specific, the wireless devices 120, 121 may be served in the first cell 115 as a primary serving cell and wireless device 122 be served in the first cell 115 as a secondary serving cell. Wireless device 120, 121 may be served in the second cell 116 as secondary serving cell. The shown wireless communications system further comprises a second base station 111 serving a third cell 117. The wireless devices 120, 122 are located in and served by the second base station 111 in the third cell 117. To be more specific, the wireless device 122 may be served in the third cell 117 as primary serving cell and the wireless device 120 may be served in the third cell 117 as secondary serving cell.

The wireless communications system 100 typically, as shown, also comprises, one or more additional network nodes, such as a first network node 130 and a second network node 140. The first and second network nodes 130, 140 may be comprised in a core network part of the wireless communications system 100, which in case of an LTE-based system may be referred to as an Evolved Packet Core (EPC) network. The base stations 110, 111 are typically comprised in a Radio Access Network (RAN) part of the wireless communications system 100, which in case of an LTE-based system may be referred as an Evolved UMTS Terrestrial Radio Access Network (E-UTRAN).

In case of an LTE based system, the first network node 130 may correspond to a Serving Gateway, as known from LTE. The Serving Gateway has a main task of tunnelling user plane data between a PDN Gateway (node not shown here), also known from LTE, and the base stations 110, 111. The PDN Gateway 142 has a task of acting as an interface between an internal IP network of an operator of the wireless communications system 100 and an external network, e.g. the Internet.

In case of an LTE based system, the second network node 140 may correspond to a Mobility Management Entity (MME), as known from LTE. The MME may be regarded as main responsible for session control signalling and setting up and configuring of radio bearers for the user plane traffic to and from the wireless devices 120-122.

It should be noted that FIG. 1 is only schematic and for exemplifying purpose. The wireless communications system 100 may, and typically will, in reality comprise several further cells, base stations, wireless devices, and also additional network nodes as realized by the skilled person, but which are not shown herein for simplicity. Hence, the situation shown in FIG. 1 and discussed above, is not in every detail a prerequisite for embodiments herein, as should be understood by the skilled person, and in particular when considering the present disclosure as a whole.

Figure 2:
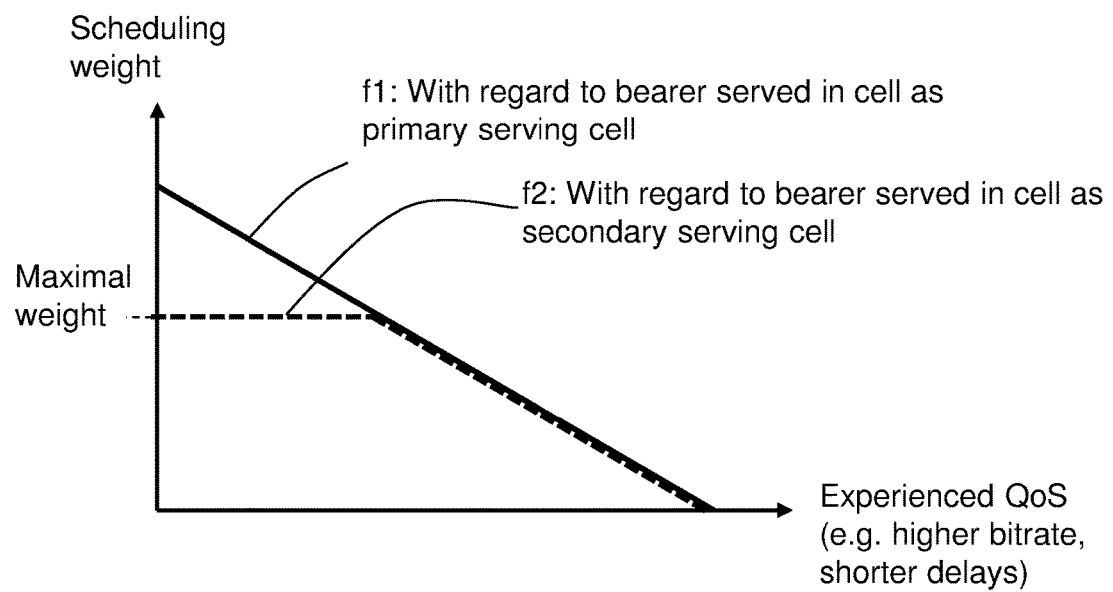
FIG. 2 schematically illustrates, for explaining a principle underlying embodiments herein, two scheduling weight functions for prioritizing scheduling of resources to radio bearers.

FIG. 2 schematically illustrates, for explaining a principle underlying embodiments herein, two scheduling weight functions, f1, and f2, for prioritizing scheduling of resources to radio bearers served in a cell, e.g. the cell 115, in a wireless communication system, e.g. the wireless communications system 100, applying carrier aggregation. The functions f1, f2 are dependent on one and the same variable here denoted "Experienced QoS" and associated with one and the same QoS attribute. Since the figure is for presentational purposes the functions are shown with regard to a generic QoS attribute and not a specific one. The radio bearer prioritized according to f1 is a radio bearer served in the cell as a primary serving cell and e.g. associated with the wireless device 120, and the radio bearer prioritized according to f2 is a radio bearer served in the cell as a secondary serving cell and e.g. associated with the wireless device 122. The respective radio bearer is further associated with a service, e.g. streaming video. In case of streaming video the experienced QoS may e.g. relate to bitrate and/or delay. The radio bearers prioritized according to f1 and f2 are associated with one and the same quality of service requirement and f1 and f2 would therefore, in a conventional case, be the same function, i.e. only one function would be used. However, in accordance with embodiments herein it is instead suggested that a higher weight, i.e. higher priority, is assigned to the radio bearer served in the cell as primary serving cell than to the radio bearer served in the cell as secondary serving cell. This can be clearly seen to be the case in the figure for low experienced QoS where f2 assigns a greater weight to the radio bearer served in the cell as primary serving cell than what is assigned by f2 to the radio bearer served in the cell as secondary serving cell.

In accordance with the illustrated situation it may be preferred to let f2 be the same function as f1 except from that f2 is limited by a maximal priority, or weight, valid for assignment. i.e. that f2 differs from f1 by being limited by a maximal priority, or weight, that f2 at most can result in. Or in other words, there may be a maximum weight or priority that a radio bearer can get if it is served in a secondary cell. The maximal or maximum priority or weight may be chosen such that primary users that have a priority slightly above the maximum priority will have an acceptable QoS. Also, the maximum might be adjusted and/or based on other parameters for example the Allocation and Retention Priority, ARP, where higher ARP priority gives higher maximum priority and vice versa, or the QoS that is expected for the bearer, where better expected QoS gives a higher maximum priority.

This results in simple implementation and compatibility with conventional systems and functionality. For example, the same weight functions that already are in use in conventional systems may basically continue to be used, with the slight change that in case of a system applying carrier aggregation and the function is to be applied to a radio bearer served in a cell as secondary serving cell, said limitation to a maximal weight, i.e. priority, is applied. This may e.g. be implemented by letting a conventional function evaluate conventionally but if the resulting weight is larger than the maximal weight, the maximal weight is instead used as result. This enables fast and simple implementation as should be realized by the skilled person.

However, as should also be realized by the skilled person, it is of course possible to use functions that differ in other ways than shown and exemplified in FIG. 2, e.g. by having different slopes etc., without departing from the underlying principle. The underlying principle may be expressed as that the radio bearers served in the cell as secondary cell, at least in a lower domain of experienced QoS, such as in a high load, or congestion, situation where the full capacity of the cell is or is nearly fully utilized, are assigned lower weight or priority than radio bearers served in the cell as primary cell. As a result the radio bearers served in the cell as secondary serving cell will get down prioritized by the scheduler compared to radio bearers served in the cell as primary serving cell, even when the radio bearers are associated with corresponding or even same QoS attribute and requirement.

As should be realized by the skilled person, the principle is applicable also when scheduling weights or priorities are assigned by other means than by functions.

An advantage of the above is that in high load situations the resources scheduled in the cell as primary serving cell will dominate and behavior will tend towards that in a conventional system without carrier aggregation. On the other hand, in low load situations, high peak rates as expected and desirable from a system applying carrier aggregation are still possible. That is, if the cell is congested there will be more transmissions to and/or from radio bearers that have the cell as primary serving cell, and radio bearers that have this cell as a secondary serving cell will experience less throughput in that cell. However, in the latter case, the wireless device associated with the radio bearers also served in another primary serving cell and radio bearers therein will be given higher priority when needed. The above e.g. implies that radio bearers will not be scheduled in a secondary cell, when there are many radio bearers that have the cell as primary cell and they are in danger of violating their QoS requirement. To sum up, simple implementation and efficient utilization of benefits from carrier aggregation are enabled.

Figure 3:
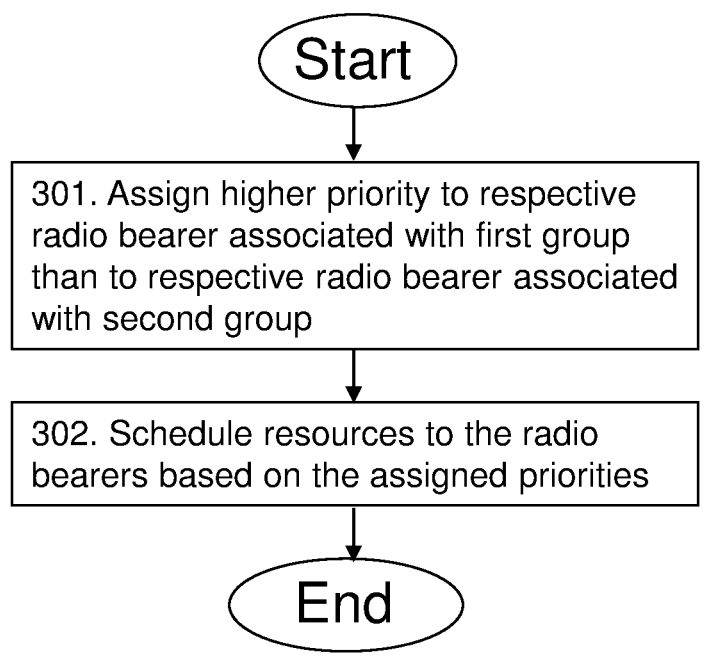
FIG. 3 is a flow chart illustrating a method in a network node for scheduling of resources to radio bearers associated with wireless devices according to embodiments herein.

Embodiments herein relating to a method in a network node, e.g. the base station 110, for scheduling of resources to radio bearers associated with wireless devices, such as wireless devices 120, 121, 122, will now be further elaborated and described with reference to the flowchart depicted in FIG. 3. The base station 110 and the wireless devices 120, 121, 122 will be used as non-limiting examples in the following. Note that even if the method, at least for LTE based systems, is typically performed in the base station 110, it may be performed in any node that comprises functionality for scheduling of resources to radio bearers, e.g. the Radio Network Controller (RNC) node in UMTS based systems. As already mentioned, the wireless devices 120, 121, 122 are served by the base station 110 in the cell 115. The base station 110, and the network node for scheduling of resources are being operated in a wireless communications system, e.g. the wireless communications system 100, applying carrier aggregation. Note that the network node may be a different node than the base station 110. The wireless devices 120, 121 is example of a first group of one or more wireless devices that are served in the cell 115 as primary serving cell. The wireless device 122 is example of a second group of one or more wireless devices that are served in the cell 115 as secondary serving cell. The method comprises the following actions, which actions may be taken in any suitable order. Further, actions may be combined.

Action 301

The network node, e.g. the base station 110, assigns higher priority to respective radio bearer associated with the first group than to respective radio bearer associated with the second group based on that the second group is served in the cell 115 as a secondary serving cell. This may be the case although the radio bearers are associated with one and the same quality of service requirement and experience the same quality of service. Reasons for this was discussed above in connection with FIG. 2.

In some embodiments, the respective radio bearer associated with the second group is assigned lower priority than respective radio bearer associated with the first group based on that the priorities are limited by a maximal priority valid for assignment to the second group. The maximal priority was also discussed above.

Further, in some embodiments, the priorities assigned to respective radio bearer in the first group were assigned according to a first function, e.g. the function f1, and the priorities assigned to the respective radio bearer in the second group are assigned according to a second function, e.g. function f2. The second function may differ from the first function by being limited by a maximal priority that the second function at most results in.

Action 302

The network node, schedules the resources to the radio bearers based on the assigned priorities. The present action may be performed in a conventional manner for prioritized radio bearers.

Some advantages associated with the method were described above in connection with FIG. 2. A further advantage is achieved if the method is combined with certain admission control handling that will be further described below. Hence it is advantageous to, in some embodiments of the method discussed above in relation to FIG. 3, admit the radio bearers associated with the second group to be set up and be served in the cell 115 based on identification that the radio bearers are associated with the cell 115 as secondary serving cell, e.g. based on that the respective radio bearer in the second group belong to a wireless device, e.g. the wireless device 122, that is served in the cell as a secondary serving cell. The radio bearers may thus be admitted to be set up without basing the admission on a present load in the cell 115 as conventionally would be done in admission control. The present load may here refer to load according to one or more MSRs in the cell 115.

That is, it may be advantageous to perform admission control for admitting the radio bearers to be set up, without considering the present, i.e. current, load in the cell 115 for the radio bearers served in the cell 115 as secondary serving cell, only for the radio bearers served in the cell 115 as primary serving cell. Or in other words, perform admission control only for a request for radio bearer set-up in the cell 115, or in any cell in the wireless communications system 100, when the request relates to a radio bearer to be set up in the cell as a primary cell. A request that relates to a radio bearer to be set up in the cell as secondary serving cell may be admitted without performing any admission control. In the latter case, the above-described method for scheduling of resources will make sure that in cases of high load, the radio bearers that were admitted to be set up in the cell as secondary serving cell will nevertheless be down-prioritized. Admitting them without admission control may therefore be regarded safe. An advantage from combining the method for scheduling of resources with said kind of admission control is thus that there is no need to implement any complex admission control for wireless communications systems applying carrier aggregation, instead conventional admission control may be used for radio bearer set-up in primary serving cells and admission control for radio bearer set-up in secondary serving cells need not be implemented at all, or may be regarded trivial since all requests may be admitted.

Figure 4:
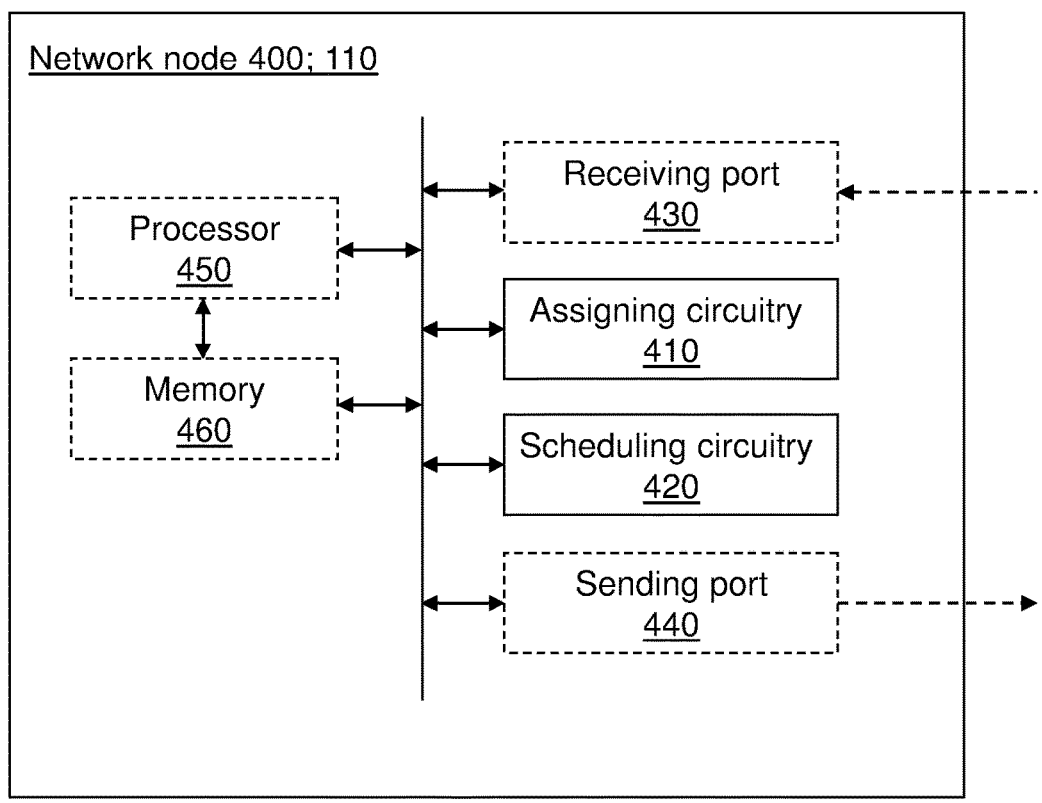
FIG. 4 is a schematic block diagram illustrating a network node for scheduling of resources to radio bearers associated with wireless devices according to embodiments herein.

To perform the actions 301-302 above for scheduling of resources to radio bearers associated with wireless devices, said network node, e.g. the base station 110, may comprise an arrangement schematically depicted in FIG. 4, which refers to the network node as a network node 400.

The network node 400 comprises an assigning circuitry 410 configured to assign said higher priority to respective radio bearer associated with the first group than to the respective radio bearer associated with the second group.

The network node 400 further comprises a scheduling circuitry 420 configured to schedule the resources to the radio bearers based on the assigned priorities.

The network node 400 may comprise a receiving port 430 configured to receive information from and be involved in communication with other nodes and units, e.g. the MME mentioned above in case of a LTE-based system.

The network node may further comprise a sending port 440 configured to send information to and be involved in communication with other nodes and units, e.g. the MME mentioned above in case of a LTE-based system. In systems where the network node 400 is separate from the base station 110, the sending port 440 may be configured to send information to the base station 110 to make the base station 110 apply resources according to the scheduling that has been performed.

The embodiments of the network node 400 may be implemented through one or more processors, such as a processor 450 in the network node 400 depicted in FIG. 4, together with computer program code for performing the functions and actions of embodiments herein. In some embodiments the circuitry discussed above may be fully or partially implemented by the processor 450.

The computer program code mentioned above may also be provided as a computer program product, for instance in the form of a data carrier carrying computer program code for performing the embodiments herein when being loaded into the in the network node 400. One such carrier may be in the form of a CD or DVD. It is however feasible with other data carriers such as a memory stick, memory card or hard drive. The computer program code may furthermore be provided as pure program code on a server for download to the network node 400. The computer program code may furthermore be provided in the form of a data file or files on, or available through, a server for download. The file or files may be executable files for direct or indirect download to and execution on the network node 400, or may be for intermediate download and compilation to make them executable before download to and for execution in the network node 400. The server may be accessible over a computer network, such as the Internet, and may e.g. be a web or ftp server.

The network node 400 may further comprise a memory 460 comprising one or more memory units. The memory

460 is arranged to store data, such as maximal priority or weight values, priority or weight functions, and/or configurations and/or applications to perform the method when being executed in the network node 400.

Those skilled in the art will also appreciate that the circuitry and ports 410-440 may refer to a combination of analog and digital circuits, and/or one or more processors configured with software and/or firmware (e.g., stored in memory) that, when executed by the one or more processors such as the processor 450, perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

The admission control described above may be performed separate from the method for scheduling of resources to radio bearers, which will be described next.

Figure 5:
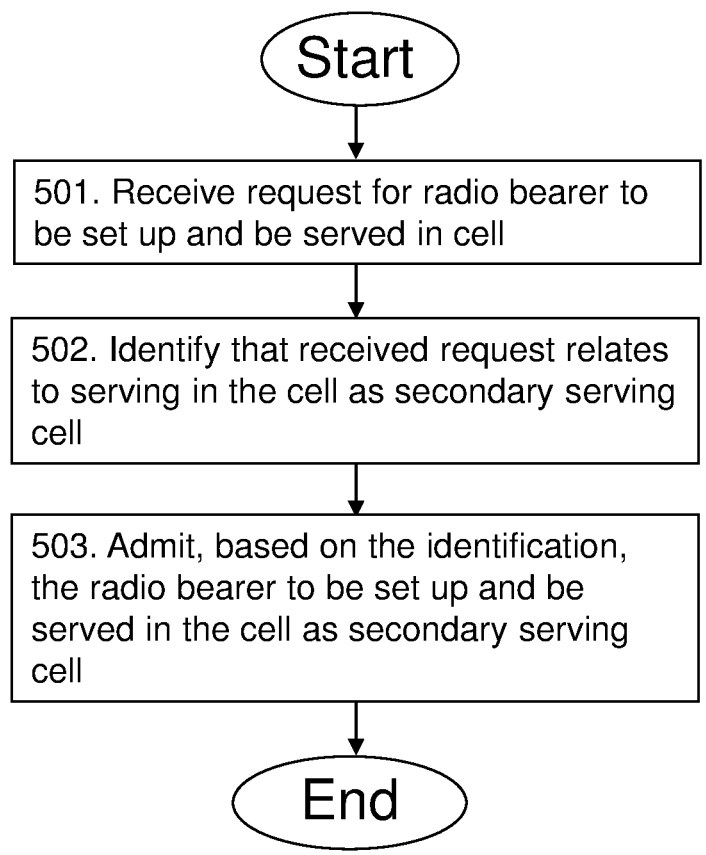
FIG. 5 is a flow chart illustrating a method in a network node for admitting a radio bearer to be set-up and be served in a cell according to embodiments herein.

Hence, embodiments herein relating to a method in a network node, e.g. the base station 110, for admitting a radio bearer to be set-up and be served in a cell, e.g. the cell 115, will now be further elaborated and described with reference to the flowchart depicted in FIG. 5. The base station 110 and the cell 115 will be used as a non-limiting examples in the following. Note that even if the method, at least for LTE based systems, is typically performed in the base station 110, it may in some embodiments be performed in another network node, e.g. a network node that conventionally comprises functionality for admission control. In UMTS based systems, this may e.g. be a node comprising the Radio Network controller (RNC). The radio bearer is associated with a wireless device, e.g. the wireless device 122 served by a base station, e.g. the base station 110, in the cell 115. The wireless device 122 and the base station 110 will be used as non-limiting examples in the following. The network node and the base station are being operated in a wireless communications systemapplying carrier aggregation, e.g. the wireless communications system 100 that will be used as a non-limiting example in the following. The wireless device 122 is served in the cell 115 as secondary serving cell. The method comprises the following actions, which actions may be taken in any suitable order. Further, actions may be combined.

Action 501

The network node, e.g. the base station 110, receives a request for the radio bearer to be set up and be served in the cell 115. The request may be received from a node that is responsible for initiation set-up of radio bearers, which typically is the MME node in a LTE-based system and e.g. the Serving GPRS Support Node (SGSN) in a UMTS-based system.

Action 502

The network node, e.g. the base station 110, identifies that the received request relates to serving in the cell 115 as secondary serving cell. As realized by the skilled person, the identification is simple to perform or may even be implicit since the system, including e.g. the base station 110, is aware of whether a particular wireless device is being served in a cell as primary or secondary serving cell when the system applies carrier aggregation.

Action 503

The network node, e.g. the base station 110, admits, based on the identification, the radio bearer to be set up and be served in the cell 115 as secondary serving cell. As discussed above, the radio bearer may thus be admitted without basing the admission on a present load in the cell 115, in contrast to conventional admission control. The present load may refer to load according to one or more MSRs in the cell 115.

Figure 6:
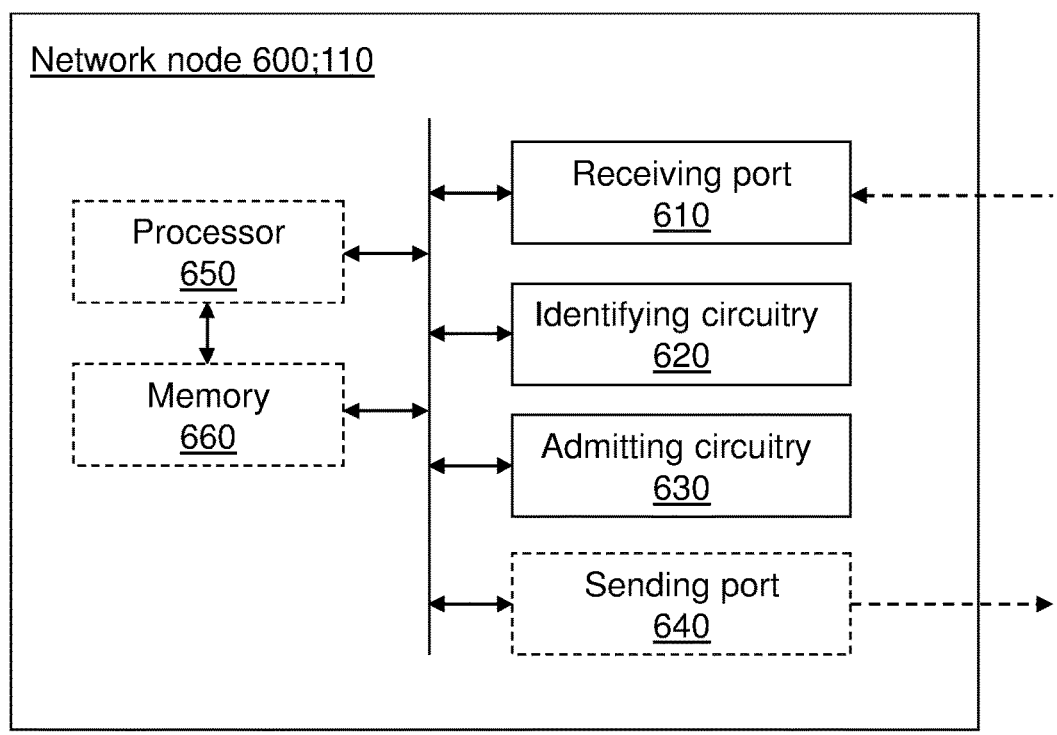
FIG. 6 is a schematic block diagram illustrating a network node for admitting a radio bearer to be set-up and be served in a cell according to embodiments herein.

To perform the actions 501-503 above for for admitting the radio bearer to be set-up and be served in the cell 115, the network node, e.g. the base station 110, may comprise an arrangement schematically depicted in FIG. 6, which refers to the network node as a network node 600.

The network node 600 comprises a receiving port 610 configured to receive the request for the radio bearer to be set up and be served in the cell 115. The receiving port 610 may generally be configured to receive information from and be involved in communication with other nodes and units, e.g. the MME mentioned above in case of a LTE-based system.

The network node 600 further comprises an identifying circuitry 620 configured to identify that the received request relates to serving in the cell 115 as secondary serving cell.

Moreover, the network node 600 comprises an admitting circuitry 630 configured to admit, based on the identification, the radio bearer to be set up and be served in the cell 115 as secondary serving cell.

The network node 600 may further comprise a sending port 640 configured to send information to and be involved in communication with other nodes and units, e.g. the MME mentioned above in case of a LTE-based system. In systems where the network node 600 is separate from the base station 110, the sending port 640 may be configured to send information to the base station 110 about admitted radio bearers.

The embodiments of the network node 600 may be implemented through one or more processors, such as a processor 650 in the network node 600 depicted in FIG. 6, together with computer program code for performing the functions and actions of embodiments herein. In some embodiments the circuitry discussed above may be fully or partially implemented by the processor 650.

The computer program code mentioned above may also be provided as a computer program product, for instance in the form of a data carrier carrying computer program code for performing the embodiments herein when being loaded into the in the network node 600. One such carrier may be in the form of a CD or DVD. It is however feasible with other data carriers such as a memory stick, memory card or hard drive. The computer program code may furthermore be provided as pure program code on a server for download to the network node 600. The computer program code may furthermore be provided in the form of a data file or files on, or available through, a server for download. The file or files may be executable files for direct or indirect download to and execution on the network node 600, or may be for intermediate download and compilation to make them executable before download to and for execution in the network node 600. The server may be accessible over a computer network, such as the Internet, and may e.g. be a web or ftp server.

The network node 600 may further comprise a memory 660 comprising one or more memory units. The memory 660 is arranged to store data, such as configurations and/or applications to perform the method when being executed in the network node 600.

Those skilled in the art will also appreciate that the circuitry and ports 610-640 may refer to a combination of analog and digital circuits, and/or one or more processors configured with software and/or firmware (e.g., stored in memory) that, when executed by the one or more processors such as the processor 650, perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

Generally, embodiments herein are not limited to the above described features and details. Various alternatives, modifications and equivalents may be used. Therefore, the above embodiments should not be taken as limiting the scope of the invention, which is defined by the appending claims.

When using the word "comprise" or "comprising" it shall be interpreted as non-limiting, i.e. meaning "consist at least of".

The invention claimed is:

1. A method in a network node for scheduling of resources to radio bearers associated with wireless devices being served by a base station in a cell, the network node and the base station operating in a wireless communications system applying carrier aggregation, wherein the cell operates as a primary serving cell for a first group of one or more wireless devices and operates as a secondary serving cell for a second group of one or more wireless devices, and wherein the method comprises:
determining scheduling priorities for one or more first radio bearers being used in the cell for serving the first group of one or more wireless devices, according to a first function that depends on an experienced Quality-of-Service (QoS), as experienced by respective ones of the first group of one or more wireless devices; and
determining scheduling priorities for one or more second radio bearers being used in the cell for serving the second group of one or more wireless devices, according to a second function that depends on the experienced QoS, as experienced by respective ones of the second group of one or more wireless devices, and wherein, at least under certain cell loading conditions, the second function at least yields a lower maximum scheduling priority as compared to the first function for a same experienced QoS; and
scheduling the resources to respective ones of the one or more first radio bearers and the one or more second radio bearers in dependence on the scheduling priorities.

2. The method as claimed in claim 1, wherein the second function is the same as the first function except that a maximal scheduling priority producible by the second function is reduced or capped in comparison to the first function, at least under said certain cell loading conditions.

3. The method as claimed in claim 1, wherein said certain cell loading conditions are times during which a load in the cell is deemed to be high, and wherein the second function is limited to the reduced maximal value when the load in the cell is deemed to be high, and further wherein the second function is not limited to the reduced maximal value when the load in the cell is not deemed to be high, such that the first and second functions produce identical scheduling priorities for the same experienced QoS during times when the load in the cell is not deemed to be high.

4. The method as claimed in claim 1, further comprising using different admission criteria for deciding, in admission control handing, whether to setup a given one of the one or more second radio bearers in the cell, as compared to setting up a given one of the one or more first radio bearers in the cell, such that the admission control handling allows setup of the given second radio bearer in the cell under cell loading conditions for which the admission control handling would not allow setup of the given first radio bearer.

5. The method as claimed in claim 1, wherein the one or more first radio bearers and the one or more second radio bearers are admitted to be set up in the cell without basing the admission on a present load in the cell.

6. The method as claimed in claim 5, wherein the present load refers to a cell load according to one or more monitored system resources in the cell.

7. A network node for scheduling of resources to radio bearers associated with wireless devices being served by a base station in a cell, the network node and the base station being configured to operate in a wireless communications system applying carrier aggregation, wherein the cell operates as a primary serving cell for a first group of one or more wireless devices and operates as a secondary serving cell for a second group of one or more wireless devices, and wherein the network node comprises:
an assigning circuit configured to:
determine scheduling priorities for one or more first radio bearers being used in the cell for serving the first group of one or more wireless devices, according to a first function that depends on an experienced Quality-of-Service (QoS), as experienced by respective ones of the first group of one or more wireless devices; and
determine scheduling priorities for one or more second radio bearers being used in the cell for serving the second group of one or more wireless devices, according to a second function that depends on the experienced QoS, as experienced by respective ones of the second group of one or more wireless devices, and wherein, at least under certain cell loading conditions, the second function at least yields a lower maximum scheduling priority as compared to the first function for a same experienced QoS; and
a scheduling circuit configured to schedule the resources to respective ones of the one or more first radio bearers and the one or more second radio bearers in dependence on the scheduling priorities.

8. The network node as claimed in claim 7, wherein the second function is the same as the first function except that a maximal scheduling priority producible by the second function is reduced or capped in comparison to the first function, at least under said certain cell loading conditions.

9. The network node as claimed in claim 7, wherein said certain cell loading conditions are times during which a load in the cell is deemed to be high, and wherein the second function is limited to the reduced maximal value when the load in the cell is deemed to be high, and further wherein the second function is not limited to the reduced maximal value when the load in the cell is not deemed to be high, such that the first and second functions produce identical scheduling priorities for the same experienced QoS during times when the load in the cell is not deemed to be high.

10. The network node as claimed in claim 7, further comprising an admitting circuit that is configured to use different admission criteria for deciding, in admission control handing, whether to setup a given one of the one or more second radio bearers in the cell, as compared to setting up a given one of the one or more first radio bearers in the cell, such that the admission control handling allows setup of the given second radio bearer in the cell under cell loading conditions for which the admission control handling would not allow setup of the given first radio bearer.

11. The network node as claimed in claim 7, wherein the one or more first radio bearers and the one or more second radio bearers are admitted to be set up in the cell without basing the admission on a present load in the cell.

12. The network node as claimed in claim 11, wherein the present load refers to a cell load according to one or more monitored system resources in the cell.

13. A method in a network node configured for operation in a wireless communications system applying carrier aggregation, wherein the method comprises:
   receiving a request for a radio bearer to be set up in a cell associated with a base station in the wireless communications system, for serving a wireless device; and
   identifying whether the requested radio bearer is being requested for serving the wireless device with the cell operating as a secondary serving cell, or for serving the wireless device with the cell operating as a primary serving cell;
   admitting the requested bearer for set up without applying certain admission control handling, if the requested bearer is identified as being requested for secondary serving cell usage; and
   admitting the requested bearer for set up conditioned on applying said certain admission control handling, if the requested bearer is identified as being requested for primary serving cell usage, such that, at least under certain cell loading conditions for the cell, the requested bearer is admitted for set up if the requested bearer is identified as being requested for secondary serving cell usage and is not admitted for set up if the requested bearer is identified as being requested for primary serving cell usage.

14. The method as claimed in claim 13, wherein, for admitted radio bearers in the cell, the method further comprises prioritizing the allocation of resources in the cell to admitted radio bearers associated with primary serving cell usage, as compared to admitted radio bearers associated with secondary serving cell usage.

15. The method as claimed in claim 14, further comprising determining a present load of the cell according to one or more monitored system resources in the cell.

16. A network node configured for operation in a wireless communications system applying carrier aggregation, wherein the network node comprises:
   a receiving port configured to receive a request for a radio bearer to be set up in a cell associated with a radio base station in the wireless communications system, for serving a wireless device;
   an identifying circuit configured to identify whether the requested radio bearer is being requested for serving the wireless device with the cell operating as a secondary serving cell, or for serving the wireless device with the cell operating as a primary serving cell; and
   an admitting circuit configured to:
      admit the requested bearer for set up without applying certain admission control handling, if the requested bearer is identified as being requested for secondary serving cell usage; and
      admit the requested bearer for set up conditioned on applying said certain admission control handling, if the requested bearer is identified as being requested for primary serving cell usage, such that, at least under certain cell loading conditions for the cell, the requested bearer is admitted for set up if the requested bearer is identified as being requested for secondary serving cell usage and is not admitted for set up if the requested bearer is identified as being requested for primary serving cell usage.

17. The network node as claimed in claim 16, wherein, for admitted radio bearers in the cell, the network node is configured to prioritize the allocation of resources in the cell to admitted radio bearers associated with primary serving cell usage, as compared to admitted radio bearers associated with secondary serving cell usage.

18. The network node as claimed in claim 17, wherein the network node further comprises a circuit configured to determine a present load of the cell according to one or more monitored system resources in the cell.

* * * * *